United States Patent [19]

Francisco

[11] Patent Number: 4,700,732
[45] Date of Patent: Oct. 20, 1987

[54] FAUCET DRAIN APPARATUS

[76] Inventor: Robert D. Francisco, 4420 Trails End NE., Oklahoma City, Okla. 73078

[21] Appl. No.: 903,699

[22] Filed: Sep. 4, 1986

[51] Int. Cl.⁴ ............................................. F16K 24/02
[52] U.S. Cl. ................................... 137/107; 137/360; 137/550; 137/801
[58] Field of Search ............... 137/107, 217, 218, 301, 137/550, 360, 801

[56] References Cited

U.S. PATENT DOCUMENTS

| | | |
|---|---|---|
| 905,818 | 12/1908 | Langford . |
| 996,600 | 6/1911 | Stotts ............................. 137/550 X |
| 1,040,039 | 10/1912 | Shapro . |
| 1,118,971 | 12/1914 | Tomko . |
| 1,127,282 | 2/1915 | Reniff . |
| 1,297,001 | 3/1919 | O'Shields . |
| 1,457,422 | 6/1923 | Buckler . |
| 1,713,370 | 5/1929 | Brady . |
| 1,719,152 | 7/1929 | Watson . |
| 1,763,513 | 6/1930 | Gullborg . |
| 1,788,449 | 1/1931 | Catlin . |
| 3,036,595 | 5/1962 | Rogers . |
| 3,055,392 | 9/1962 | Barotz . |
| 3,106,935 | 10/1963 | Gatzke ............................ 137/360 X |
| 3,406,715 | 10/1968 | Hruby ................................. 137/550 |
| 3,976,102 | 8/1976 | Crocker ........................... 137/360 X |
| 4,117,856 | 10/1978 | Carlson ........................... 137/218 X |

FOREIGN PATENT DOCUMENTS 294986 10/1916 Fed. Rep. of Germany ...... 137/107

Primary Examiner—Gerald A. Michalsky
Attorney, Agent, or Firm—Bill D. McCarthy

[57] ABSTRACT

An improved faucet drain assembly for preventing damage to a faucet due to freezing of residual water in the faucet upon exposure of the faucet to low temperature conditions. The faucet drain assembly comprises a faucet extension member supported by the faucet, the faucet extension member having a drain bore extending therethrough which is in fluid communication with the faucet, and a fluid valving assembly disposed in the drain bore and responsive to the flow pressure through the faucet. When the flow pressure in the faucet drops below a predetermined value, that is, the flow pressure of water through the faucet approaches the value where substantially no water pressure is present, the fluid valving assembly opens the drain bore so that the residual water in the faucet can be removed therethrough; whereas when the flow pressure in the faucet is above the predetermined value, that is, there is a stream of the water flowing through the faucet, the fluid valving assembly seals the drain bore to prevent discharge of water therethrough.

5 Claims, 3 Drawing Figures

FAUCET DRAIN APPARATUS

BACKGROUND OF THE INVENTION

1. Field of the Invention.

The present invention relates generally to the field of valves, and more particularly, but not by way of limitation, to a drain valve for preventing damage to an externally disposed water faucet due to low temperature conditions.

2. Brief Description of the Prior Art.

Devices known as faucets are used for controlling the flow of water from a water supply of a structure to selected locations external the structure. Generally, the faucet is secured to an external wall of the structure such that the distal end of the stem or screw spindle of the faucet is exposed, and the opposite end of the stem, which carries the valve disk for engaging a valve seat, extends through the wall of the structure. The distal end of the stem of the faucet is provided with a handle so that the relationship between the valve disk and valve seat can be altered in response to movement of the handle and to permit flow of water through the faucet.

While the structure of the faucet has generally been accepted, problems are nevertheless encountered when one permits an object, such as a hose, to remain connected to the outlet of the water faucet when low temperatures are encountered. For example, when a hose is connected to the faucet and low temperatures are encountered, residual water in the faucet may freeze resulting in a break in the waterline interior the wall structure. While it is common knowledge that such damage is likely to occur, one often forgets to disconnect the hose from the faucet.

Numerous prior art devices have been proposed for automatically draining water from a water delivery source, such as a drinking fountain, a hydrant and the like. Typical of such a prior art device is the drain-valve for a drinking fountain disclosed by Catlin (U.S. Pat. No. 1,788,449). Catlin teaches a device for attachment to the end of a spigot having a tube for normal pressurized flow of water, and a spring biased valve for engagement in a valve seat during use. When water pressure is absence, the spring forces disengagement of the valve to allow water to drain from an exposed tube.

Another typical prior art device is that disclosed in U.S. Pat. No. 1,297,001, issued O'Shields. O'Shields discloses a ball valve mounted upstream from a discharge nozzle. The valve allows the column of residue fluid in the cylindrical section of a hydrant to drain through an eduction pipe during nonuse.

Buckler (U.S. Pat. No. 1,457,422) teaches a drain valve disposed on a fire hydrant to prevent freezing thereof; and Reniff (U.S. Pat. No. 1,127,282) discloses a drainage valve in a railroad-car steam line to prevent freezing of collected water.

Numerous other devices have been proposed by the prior art in an effort to prevent residual water from freezing in a valve, especially when the valve is inadvertently attached to an object, such as a hose. However, a need has long remained for an improved faucet drain apparatus which will insure that the residual water in the faucet will be removed, and which can be built into the structure, or attached to an existing faucet. It is to such a device that the present invention is directed.

SUMMARY OF THE INVENTION

According to the present invention an improved faucet drain apparatus is provided which protects a faucet from damage resulting from low temperature conditions. Broadly, the faucet drain apparatus comprises a faucet extension member supported by the faucet, the faucet extension member having a drain bore extending therethrough which is in fluid communication with the faucet, and a fluid valving assembly disposed in the drain bore and responsive to the flow pressure through the faucet. Thus, when the flow pressure in the faucet drops below a predetermined value, that is, the flow pressure of water through the faucet approaches the value where substantially no water pressure is present, the fluid valving assembly opens the drain bore so that the residual water in the faucet can be removed therethrough; whereas, when the flow pressure in the faucet is above the predetermined value, that is, there is a stream of the water flowing through the faucet, the fluid valving assembly seals the drain bore to prevent discharge of water therethrough.

An object of the present invention is to provide a faucet drain apparatus wherein residual water in a faucet can be automatically removed to prevent damage to the faucet when the faucet is exposed to low temperature conditions.

Another object of the present invention, while achieving the before-stated object, is to provide a faucet drain apparatus which can be incorporated into a water faucet, or which can be attached to a conventional faucet so as to automatically drain residual water from the faucet.

Another object of the present invention, while achieving the before-stated objects, is to provide a faucet drain apparatus which is economical to manufacture, easy to use, and functionally reliable.

Other objects, advantages and features of the present invention will become clear from the following detailed descriptions of the preferred embodiment when read in conjunction with the drawings and the appended claims.

DESCRIPTION OF PREFERRED EMBODIMENTS

Figure 1:
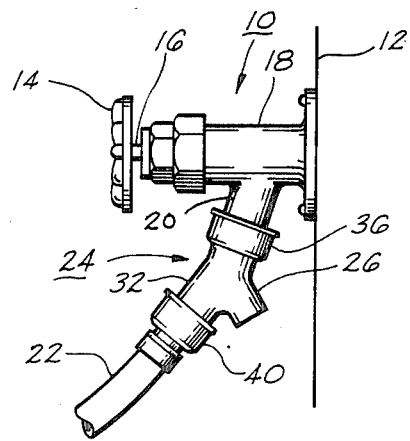
FIG. 1 is a side elevational view of a conventional water faucet connected to a faucet drain apparatus of the present invention.

Referring now to the drawings, and more particularly to FIG. 1, shown therein is a faucet 10 supported on an exterior wall of a structure, such as exterior wall 12. A faucet handle 14 is secured to a distal end of a valve stem 16, and the valve stem 16 extends through a valve body 18 and the wall 12 of the structure. The other end of the valve stem 16 is connected to a valve disk (not shown) adapted to engage a valve seat (also not shown) when the valve is a closed condition. The faucet 10 is also provided with a water discharge member or neck 20. Thus, water can be directed through the faucet 10 for discharge through the water discharge member 20 when the handle 14 is rotated in a counter clockwise direction. The faucet 10 as described above is of conventional construction; thus, no further description of the faucet 10 is believed necessary in order for one to fully understand the inventive concept set forth hereinafter.

As previously stated, water has a tendency to collect in the valve body 18 of the faucet 10, especially when a object, such as a hose 22, is connected to the faucet 10. The collection of the water in the valve body 18, i.e. residue or residual water, tends to freeze when the faucet 10 is exposed to a low temperature environment, such as during the winter time. When the residual water in the valve body 18 freezes a break in the waterline at the junction of the water supply line and the faucet 10 often occurs. In most instances, the junction formed between the water supply line and the faucet 10 is at a position within the wall structure so that in order to repair the break one must either cut a hole through the interior portion of the structure, or remove a portion of the covering surface of the exterior wall 12.

In order to prevent the inadvertent freezing of the residue water in the valve body 18 of the faucet 10, a faucet drain assembly 24 constructed in accordance with the present invention is connected to the water discharge member 20 of the faucet 10 so as to form fluid-tight connection therebetween. The connection of the faucet drain assembly 24 to the faucet 10 will automatically drain residual water from the valve body 18 of the faucet 10, even when the hose 22 is connected to the water discharge member 20 by the faucet drain assembly 24 substantially as shown in FIG. 1.

Figure 2:
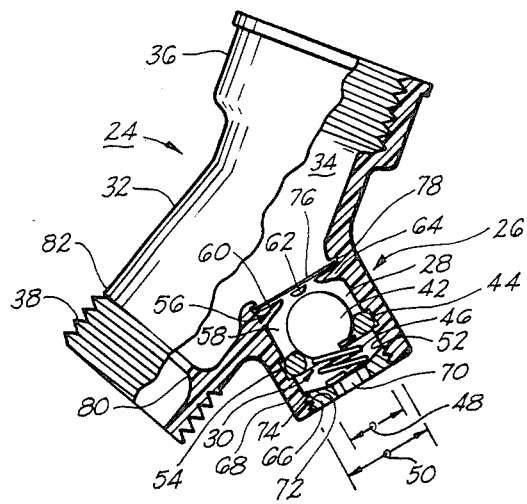
FIG. 2 is a partial cross-sectional, side elevational view of the faucet drain apparatus of FIG. 1.

Referring more specifically to FIG. 2, the faucet drain assembly 24 comprises a faucet extension member 26 having a drain bore 28 extending therethrough, and a fluid valving assembly 30 disposed within the drain bore 28. The fluid valving assembly 30 is responsive to flow pressure of water in the faucet 10 so that when the flow pressure through the faucet 10 drops below a predetermined pressure, (that is, water pressure if substantially absent in the faucet 10), the fluid valving assembly 30 opens the drain bore 28 and the residual water in the faucet 10 is drained from the valve body 18 of the faucet 10 via the drain bore 28. However, when the faucet handle 14 of the faucet 10 is rotated in a counter clockwise direction, water is permitted to flow through the faucet 10. The resulting flow pressure generated by the water flowing through the faucet 10 and the faucet drain assembly 24 causes the fluid valving assembly 30 to selectively seal the drain bore 28 of the faucet extension member 26 so that no water is discharged therethrough.

The faucet extension member 26 of the faucet drain assembly 24 further comprises a body portion 32 having a fluid flow bore 34 extending therethrough, a faucet connector 36 supported on one end of the body portion 32, and a hose connector 38 supported on the opposite end of the body portion 32 substantially as shown. When the faucet drain assembly 24 is connected to the faucet 10 via the faucet connector 36 and the water discharge member 20, respectively, the fluid flow bore 34 of the body portion 32 fluidly communicates with a water discharge bore (not shown) of the water discharge member 20 of the faucet 10. Further, the fluid flow bore 34 of the body portion 32 fluidly communicates with the drain bore 28 of the faucet extension member 26 when the flow pressure of water in the body portion 32 is below a predetermined pressure, that is, when water pressure is substantially absent in the body portion 32 of the faucet extension member 26, and thus the faucet 10.

The faucet connector 36 and the hose connector 38 are of conventional construction. Thus, the faucet connector 36 is a female connector member adapted to threadably engage the threaded male end portion of the water discharge member 20 of the faucet 10 and form a fluid-tight connection therebetween; and the hose connector 38 is a threaded male member adapted to threadably engage a female connector 40 (see FIG. 1) of the hose 22 and form a fluid-tight connection therebetween. Further, the body portion 32, the faucet connector 36, and hose connector 38 can be fabricated as a unitary member, as shown; or the faucet connector 36 can be connected to the body portion 32 in a conventional manner so that the faucet connector 36 can be rotated thereon for connecting the faucet drain assembly 24 to the faucet 10.

As previously stated, the fluid valving assembly 30 is disposed in the drain bore 28 of the faucet extension member 26 and responsive to flow pressure in the faucet 10 and the fluid flow bore 34 of the body portion 32 of the fluid valving assembly 30. That is, the fluid valving assembly 30 seals the drain bore 28 of the faucet extension member 26 when the flow of water through the faucet 10 and the fluid flow bore 34 of the body portion 32 is of a sufficient predetermined pressure to cause the fluid valving assembly 30 to close off or seal the drain bore 28. On the other hand, when the flow pressure of the water through the faucet 10 and the body portion 32 drops below a predetermined value, i.e. water pressure is absence, the fluid valving assembly 30 selectively opens the drain bore 28 so that the residual water present in the faucet 10 can be drained therefrom via the drain bore 28.

The fluid valving assembly 30 employed in the selective opening and closing of the drain bore 28 comprises a ball closure member 42, a valve seat 44 and a spring member 46. The ball closure member 42 is provided with a diameter 48 which is less than a diameter 50 of the drain bore 28 so that the ball closure member 42 can freely move through the drain bore 28.

The valve seat 44 of the fluid valving assembly 30 is supported in the drain bore 28 so as to be in close proximity to a discharge end 52 of the drain bore 28. However, it should be noted that the location of the valve seat 44 in the drain bore 28 will be dependent upon the size of the ball closure member 42, the length of the drain bore 28, the compressive strength valve of the spring member 46, and the distance of travel of the ball closure member 42 to effectively open and close the drain bore 28. In order to secure the valve seat 44, within the faucet extension member 26, a recessed portion 54 is formed in the faucet extension member 26 substantially as shown. The recessed portion 54 supports and stabilizes the valve seat 44 in the desired location in the drain bore 28 so that when the flow pressure of the water passing through the faucet 10 and the body portion 32 of the faucet extension member 26 reaches a sufficient pressure, the ball closure member 42 is forced into seating engagement with the valve seat 44 and thereby closes and seals the drain bore 28 so that no water passes through the drain bore 28.

The spring member 46 of the fluid valving assembly 30 cooperates with the valve seat 44 and the ball closure member 42 to selectively open and close the drain bore 28 in response to the flow pressure of water passing through the faucet 10 and the fluid flow bore 34 of the faucet extension member 26. The spring member 46 is disposed within the discharge end 52 of the drain bore 28 so that the spring member 46 biases the ball closure member 42 into seating engagement with the valve seat 44 to seal the drain bore 28 when the flow pressure of water through the faucet 10 and the fluid flow bore 34 of the faucet extension member 26 is above a predetermined value; and the spring member 46 biases the ball closure member 42 away from the valve seat 44 to open the drain bore 28 when the flow pressure of water passing through the faucet 10 and the fluid flow bore 34 of the faucet extension member 26 is below the predetermined pressure, i.e. water pressure is absence due to the lack of flow of water therethrough.

The predetermined value of the flow pressure of water passing through the faucet 10 and the fluid flow bore 34 of the faucet extension member 26 in order to close or seal the drain bore 28 can be varied depending upon the compressive strength of the spring member 46 of the fluid valving assembly 30. However, the spring member 46 will generally have a low compressive strength value to insure that the water issuing from the faucet 10 is selectively directed through the fluid flow bore 34 of the extension member 26, and that the drain bore 28 is effectively sealed by a usable quality of water being delivered by the faucet 10.

In order to retain the ball closure member 42 within the drain bore 28 when the spring member 46 biases the ball closure member 42 away from the valve seat 44, the fluid valving assembly 30 further comprises a ball retainer assembly 56 disposed within an inlet end portion 58 of the drain bore 28 substantially as shown. The ball retainer assembly 56 provides a cage for receiving the ball closure member 42 so that water can readily flow around the ball closure member 42, through the ball retainer assembly 56 and the drain bore 28 to drain residual water from the valve body 18 of the faucet 10 when the flow pressure of the water therethrough is below the predetermined value as previously discussed. Thus, the ball retainer assembly 56 comprises a plurality of spatially disposed projecting finger members, such as projecting finger members 60, 62 and 64 which extend into the drain bore 28 substantially as shown.

In order to support the spring member 46 in the desired location within the drain bore 28 of the faucet extension member 26, the fluid valving assembly 30 further comprises a spring retainer member 66 connected to a distal end 68 of the faucet extension member 26 containing the drain bore 28 so that the spring retainer member 66 is disposed in the discharge end 52 of the drain bore 28. The spring retainer member 66 is provided vided with a centrally disposed opening 70 therein which openingly communicates with the drain bore 28.

After extended use of the faucet drain assembly 24 it may be necessary to clean or replace certain components of the fluid valving assembly 30 to insure the effective operation of the faucet drain assembly 24. Thus, the spring retainer member 66 is desirably connected to faucet extension member 26 such that the spring retainer member 66 can be removed with minimum effort. Such can be achieved by providing the spring retainer member 66 with a threaded male portion 72 adapted to engage a threaded female portion 74 formed in the distal end 68 of the faucet extension member 26 substantially as shown. Thus, one can readily disassemble the fluid valving assembly 30 to clean same, or if required, to replace worn elements thereof.

To prevent particulate matter, such as metal clippings, deposits, rust, and the like from entering the drain bore 28 of the faucet extension member 26, and thus clogging the drain bore 28 or hindering the efficient operation of the fluid valving assembly 30, the fluid valving assembly 30 further comprises a filter member 76 supported by the faucet extension member 26 at the inlet end portion 58 of the drain bore 28. A recessed portion 78 is formed in the faucet extension member 26 at a position substantially adjacent the inlet end portion 58 of the drain bore 28 so that the filter member 76 can be supported therein substantially as shown. To prevent damage to the filter member 76 (when the ball closure member 42 is biased by the spring member 46 away from the valve seat 44 and into engagement with the ball retainer assembly 56), the filter member 76 is disposed a distance above the ball retainer assembly 56 sufficient to insure that the ball closure member 42 does not contact and damage the filter member 76 when the ball closure member 42 is in confirming engagement with the ball retainer assembly 56.

The filter member 76 can be fabricated of any suitable filter material known in the filter art. The only requirements are that the filter member 76 be fabricated of a suitable material, such as brass, having fluid flow apertures therein, which has sufficient strength so that the filter member 76 can be disposed in a stable position to transverse the drain bore 28, and that the filter member 76 has sufficient permeability to permit water to pass therethrough substantially unrestricted when the drain bore 28 is in the open position.

To insure the efficient operation of the fluid valving assembly 30 in response to flow of water through the fluid flow bore 34 of the faucet drain assembly 24, as well as to insure a desired pressure of water delivered from the faucet drain assembly 24, the faucet drain assembly further comprises a restriction member 80 formed in the body portion 32 of the faucet drain assembly 24 so as to be positioned in close proximity to a discharge end 82 of the fluid flow bore 34. The restriction member 80 extends a selected distance into the fluid flow bore 34 and serves to pressurize water exiting the fluid flow bore 34.

The faucet drain assembly 24 of the present invention provides a means for preventing damage to the faucet 10 due to low temperature conditions. Further, the faucet drain assembly 24 can easily be connected to any standard faucet without adversely effecting the operation of the faucet.

Figure 3:
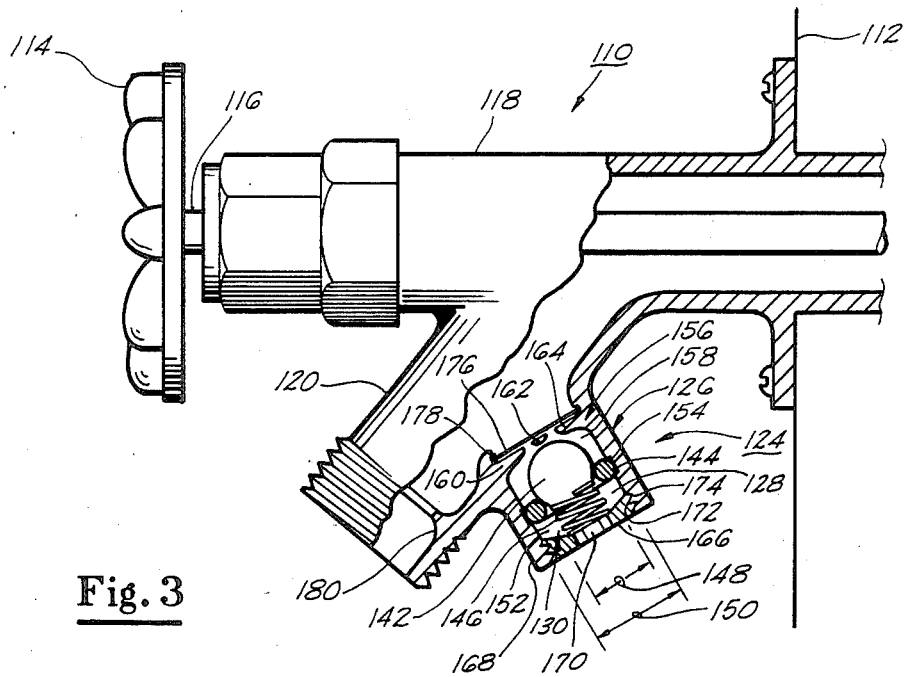
FIG. 3 is a partial cross-sectional, side elevational view of a second embodiment of a faucet drain apparatus of the present invention.

Referring now to FIG. 3, a second embodiment of a faucet 110 is illustrated, the faucet 110 having a faucet drain assembly 124 integrally formed as a component thereof. The faucet 110 is supported on an exterior wall of a structure, such as exterior wall 112, and a faucet handle 114 is secured to a distal end of a valve stem 116. The valve stem 116 extends through a valve body 118 and the wall 112 of the structure. The other end of the valve stem 116 is connected to a valve disk (not shown) adapted to engage a valve seat (also not shown) when the valve is a closed condition. The faucet 110 is also provided with a water discharge member or neck 120. Thus, water can be directed through the faucet 110 for discharge through the water discharge member 120 when the handle 114 is rotated in a counter clock wise direction.

As previously stated, water has a tendency to collect in the valve body of a faucet, especially when a hose is connected to the faucet. The collection of the water in the valve body, i.e. residue or residual water, tends to freeze when the faucet is exposed to a low temperature environment, such as during the winter time. When the residual water in the valve body of a faucet freezes a break in the waterline at the junction of the water supply line and the faucet often occurs. In most instances, the junction formed between the water supply line and the faucet is at a position within the wall structure so that in order to repair the break one must either cut a hole through the interior portion of the structure, or remove a portion of the covering surface of the exterior wall.

In order to prevent the inadvertent freezing of the residue water in the valve body 118 of the faucet 110, the water discharge member 120 of the faucet 110 is provided with the faucet drain assembly 124. The faucet drain assembly 124 of the faucet 110 will automatically drain residual water from the valve body 118 of the faucet 110, even when a hose is connected to the water discharge member 120.

The faucet drain assembly 124 comprises a faucet extension member 126 having a drain bore 128 extending therethrough, and a fluid valving assembly 130 disposed within the drain bore 128. The fluid valving assembly 130 is responsive to flow pressure of water in the faucet 110 so that when the flow pressure through the faucet 110, and thus the water discharge member 120 thereof, drops below a predetermined pressure, (that is, water pressure if substantially absence in the faucet 110), the fluid valving assembly 130 opens the drain bore 128 and the residual water in the faucet 110 is drained from the valve body 118 of the faucet 110 via the drain bore 128. However, when the handle 114 of the faucet 110 is rotated in a counter clock wise direction, water is permitted to flow through the faucet 110 and the resulting flow pressure generated by the water flowing through the faucet 110 and the water discharge member 120 causes the fluid valving assembly 130 to selectively seal or close the drain bore 128 of the faucet extension member 126 so that no water is discharged through the drain bore 128.

As previously stated, the fluid valving assembly 130 is disposed in the drain bore 128 of the faucet extension member 126 and responsive to flow pressure in the faucet 110 and the water discharge member 120 of the faucet 110. That is, the fluid valving assembly 130 seals the drain bore 128 of the faucet extension member 126 when the flow of water through the faucet 110 and the water discharge member 120 obtains a sufficient predetermined pressure to cause the fluid valving assembly 130 to close off or seal the drain bore 128. On the other hand, when the flow pressure of the water through the faucet 110 and the water discharge member 120 of the faucet 110 drops below a predetermined value, i.e. water pressure is absence, the fluid valving assembly 130 selectively opens the drain bore 128 so that residual water in the valve body 118 of the faucet 110 can be drained therefrom via the drain bore 128.

The fluid valving assembly 130 for selectively opening and closing the drain bore 128 comprises a ball closure member 142, a valve seat 144 and a spring member 146. The ball closure member 142 has a diameter 148 which is less than a diameter 150 of the drain bore 128 so that the ball closure member 142 can freely move through the drain bore 128.

The valve seat 144 of the fluid valving assembly 130 is supported in the drain bore 128 so as to be in close proximity to a discharge end 152 of the drain bore 128. However, it should be noted that the location of the valve seat 144 in the drain bore 128 will be dependent upon the size of the ball closure member 142, the compressive strength value of the spring member 146, and the distance of travel of the ball closure member 142 in the drain bore 128 to effectively open and close the drain bore 128.

To secure the valve seat 144 within the faucet extension member 126, a recessed portion 154 is formed in the faucet extension member 126 substantially as shown. The recessed portion 154 supports and stabilizes the valve seat 144 in the desired location in the drain bore 124 so that when the flow pressure of the water passing through the faucet 110 and the water discharge member 120 of the faucet 110 reaches a sufficient pressure, the ball closure member 142 is forced into seating engagement with the valve seat 144 to close and seal the drain bore 128 so that no water passes through the drain bore 128.

The spring member 146 of the fluid valving assembly 130 cooperates with the valve seat 144 and the ball closure member 142 to selectively open and close the drain bore 128 in response to the flow pressure of water passing through the faucet 110 and the water discharge member 120 thereof. The spring member 146 is disposed within the discharge end 152 of the drain bore 128 so that the spring member 146 biases the ball closure member 142 into seating engagement with the valve seat 144 to seal the drain bore 128 when the flow pressure of water through water discharge member 120 of the faucet 110 is above a predetermined value; and the spring member 146 biases the ball closure member 142 away from the valve seat 144 to open the drain bore 128 when the flow pressure passing through the water discharge member 120 of the faucet 110 is below the predetermined pressure, i.e. water pressure is absent due to the lack of flow of water therethrough.

The predetermined value of the flow pressure of water passing through the faucet 110, and thus the water discharge member 120, in order to close or seal the drain bore 128 can be varied depending upon the compressive strength of the spring member 146 of the fluid valving assembly 130. However, the spring member 146 will generally have a low compressive strength value to insure that the water is selectively directed through the water discharge member 120 of the faucet 110, and that the drain bore 128 is effectively sealed by a usable flow of water through the faucet 110.

In order to retain the ball closure member 142 within the drain bore 128 when the spring member 146 biases the ball closure member 142 away from the valve seat 144, the fluid valving assembly 130 further comprises a ball retainer assembly 156 disposed within an inlet end portion 158 of the drain bore 128 substantially as shown. The ball retainer assembly 156 provides a cage for receiving the ball closure member 142 so that water can readily flow around the ball closure member 142, through the ball retainer assembly 156 and the drain bore 128 when the flow pressure of the water through the faucet 110 therethrough is below the predetermined value as previously discussed. Thus, the ball retainer assembly 156 comprises a plurality of spatially disposed projecting finger members, such as projecting finger members 160, 162 and 164 which extend into the drain bore 128 as shown.

In order to support the spring member 146 in the desired location within the drain bore 128 of the faucet extension member 126, the fluid valving assembly 130 further comprises a spring retainer member 166 connected to a distal end 168 of the faucet extension member 126 so that the spring retainer member 166 is disposed with the discharge end 152 of the drain bore 128. The spring retainer member 166 is provided with a centrally disposed opening 170 therein which openingly communicates with the drain bore 128.

After extended use of the faucet drain assembly 124 it may be necessary to clean or replace certain components of the fluid valving assembly 130 to insure the effective operation of the faucet drain assembly 124. Thus, the spring retainer member 166 is desirably connected to faucet extension member 126 such that the spring retainer member 166 can be removed with minimum effort. Such can be achieved by providing the spring retainer member 166 with a threaded male portion 172 adapted to engage a threaded female portion 174 formed in the distal end 168 of the faucet extension member 126 substantially as shown. Thus, one can readily disassemble the fluid valving assembly 130 to clean same, or if required, to replace worn elements thereof.

To prevent particulate matter, such as metal clippings, deposits, rust, and the like from entering the drain bore 128 of the faucet extension member 126, and thus clogging the drain bore 128 or hindering the efficient operation of the fluid valving assembly 130, the fluid valving assembly 130 further comprises a filter member 176 supported by the faucet extension member 126 at the inlet end portion 158 of the drain bore 128. A recessed portion 178 is formed in the faucet extension member 126 at a position substantially adjacent the inlet end portion 158 of the drain bore 128 so that the filter member 176 can be supported therein substantially as shown. To prevent damage to the filter member 176 (when the ball closure member 142 is biased by the spring member 146 away from the valve seat 144 and into engagement with the ball retainer assembly 156), the filter member 176 is disposed a distance above the ball retainer assembly 156 sufficient to insure that the ball closure member 142 does not contact and damage the filter member 176 when the ball closure member 142 is in confirming engagement with the ball retainer assembly 156.

The filter member 176 can be fabricated of any suitable filter material known in the filter art. The only requirements are that the filter member 176 be fabricated of a suitable material, such as brass having fluid flow apertures therein, which has sufficient strength so that the filter member 176 can be disposed in a stable position to transverse the drain bore 128, and that the filter member 176 has sufficient permeability to permit water to pass therethrough substantially unrestricted when the drain bore 128 is in the open position.

To insure the efficient operation of the faucet 110, a restriction member 180 is formed in the water discharge member 120 so as to be in close proximity to the discharge end thereof. The restriction member 180 serves to pressurize water exiting the water discharge member 120 in a manner conventional with a standard faucet.

The faucet drain assemblies 24 and 124 of the present invention provide a means for preventing damage to the faucets 10 and 110, respectively, due to low temperature condition. While the faucet drain assembly 24 can be connected to any conventional standard faucet, the faucet 110 containing the faucet drain assembly 124 is a replacement for the conventional faucet in the construction of a structure. Further, the faucet drain assembly 24 and the faucet drain assembly 124 of the faucet 110 can be fabricated of any suitable materials conventionally employed in the fabrication of faucets, plumbing components and the like.

It is clear that the present invention is well adapted to carry out the objects and to attain the ends and advantages mentioned herein as well as those inherent in the invention. While presently preferred embodiments of the invention have been described for purposes of this disclosure, numerous changes may be made which will readily suggest themselves to those skilled in the art and which are accomplished within the spirit of the invention disclosed and as defined in the appended claims.

What is claimed is:

1. A faucet drain apparatus for protecting a faucet from low temperature effects, the faucet drain apparatus comprising:

a faucet extension member supported by the faucet, the faucet extension member comprising a body portion having a fluid flow bore extending therethrough and a drain bore, the drain bore communicating with the flow bore so that residual water present in the body portion can be drained from the body portion through the drain bore; and fluid valving means disposed in the drain bore and responsive to flow pressure through the fluid flow bore for sealing the drain bore in the presence of a predetermined flow pressure of fluid in the fluid flow bore and for opening the drain bore when the flow pressure of the fluid in the fluid flow bore drops below the predetermined value, the fluid valving means comprising: a ball closure member disposed within the drain bore;

a valve seat supported in close proximity to a discharge end of the drain bore; and a spring member disposed within the discharge end of the drain bore for biasing the ball closure member in seating engagement with the valve seat so as to seal the drain bore when the flow pressure of the fluid in the fluid flow bore is above the predetermined value, the spring member biasing the ball closure member away from the valve seat to open the drain bore when the flow pressure of the fluid in the fluid flow bore is below the predetermined value;

ball retainer means for retaining the ball closure member within the drain bore when the spring member biases the ball closure member away from the valve seat, the ball retainer member being disposed within the drain bore so as to be in close proximity to an inlet end of the drain bore, and the ball retainer member permitting fluid flow therethrough for passage around the ball closure member when the ball closure member is biased away from the valve seat; and filter means disposed within the inlet end of the drain bore of the faucet extension member for removing particulate materials from fluid passing through the drain bore and for preventing the particulate materials from entering the drain bore, the filter means disposed a distance upstream of the ball retainer means so as to prevent contact of the ball closure member with the filter means when the ball closure member is biased away from the valve seat.

2. The faucet drain apparatus of claim 1 wherein the faucet extension member further comprises:

a faucet connector supported on one end of the body portion for connection to the faucet such that a fluid-tight connection is formed therebetween; and a hose connector supported on the other end of the body portion for connection to a hose member such that a fluid-tight connection is formed therebetween.

3. A faucet drain apparatus for protecting a faucet from low temperature effects, the faucet drain apparatus comprising:

a faucet extension member supported by the faucet, the faucet extension member comprising a body portion having a fluid flow bore extending therethrough and a drain bore, the drain bore communicating with the flow bore so that residual water present in the body portion can be drained from the body portion through the drain bore, the faucet extension member comprising:

a faucet connector supported on one end of the body portion, the faucet connector connectable to the faucet so as to establish fluid communication between the faucet and the fluid flow bore of the body portion; and a hose connector supported on the other end of the body portion, the hose connector connectable to a hose member so as to form a fluid-tight connection therebetween and established fluid communication between the faucet and the hose member via the fluid flow bore of the body portion;

fluid valving means disposed in the drain bore and responsive to flow pressure through the fluid flow bore for sealing the drain bore in the presence of a predetermined flow pressure of fluid in the fluid flow bore and for opening the drain bore when the flow pressure of the fluid in the fluid flow bore drops below the predetermined value, the fluid valving means comprising:

a ball closure member disposed within the drain bore;

a valve seat supported in close proximity to a discharge end of the drain bore; and a spring member disposed within the discharge end of the drain bore for biasing the ball closure member in seating engagement with the valve seat so as to seal the drain bore when the flow pressure of the fluid in the fluid flow bore is above the predetermined value, the spring member biasing the ball closure member away from the valve seat to open the drain bore when the flow pressure of the fluid in the fluid flow bore is below the predetermined value; and ball retainer means for retaining the ball closure member within the drain bore when the spring member biases the ball closure member away from the valve seat, the ball retainer member being disposed within the drain bore so as to be in close proximity to an inlet end of the drain bore, and the ball retainer member permitting fluid flow therethrough for passage around the ball closure member when the ball closure member is biased away from the valve seat.

4. The faucet drain apparatus of claim 3 wherein the fluid valving means further comprises:

a spring retainer member removably connected to the faucet extension member at the discharge end of the drain bore to support the spring member in the drain bore.

5. The faucet drain apparatus of claim 4 wherein the fluid valving means further comprises:

filter means connected to the faucet extension member at the junction of the fluid flow bore and the drain bore for removing particulate materials from the fluid and for preventing the particulate materials from entering the drain bore when the drain bore is opened in response to the flow pressure of fluid through the fluid flow bore dropping below the predetermined value, the filter means disposed a distance from the ball retainer means so as to prevent contact between the ball closure member and the filter means when the ball closure member is biased away from the valve seat and the drain bore is opened.

* * * * *

UNITED STATES PATENT AND TRADEMARK OFFICE
CERTIFICATE OF CORRECTION

PATENT NO. : 4,700,732

DATED : October 20, 1987

INVENTOR(S) : Robert D. Francisco

It is certified that error appears in the above-identified patent and that said Letters Patent is hereby corrected as shown below: On the Title Page:

Heading [76], entitled Inventor:, second line, reads "NE., Oklahoma City, Okla. 73078" should read --NE., Piedmont, Okla. 73078--. In column 5, line 52, the word "vided" should be deleted. In column 7, line 29, the word "if" should read "is"; in column 7, line 29, the word 'absence" should read --absent--.

Signed and Sealed this

Third Day of May, 1988

Attest:

DONALD J. QUIGG

Attesting Officer

Commissioner of Patents and Trademarks